United States Patent [19]

Schofield et al.

[11] Patent Number: 4,728,171

[45] Date of Patent: Mar. 1, 1988

[54] SYSTEM FOR USE IN TEMPORARY REPAIR OF MULTIPLE FIBER CABLE

[75] Inventors: Philip W. Schofield, Geneva, Ill.; Donald W. Duda, Williams Bay, Wis.; Peter Chang, Lisle; Darrin J. Bergman, Naperville, both of Ill.

[73] Assignee: Amphenol Corporation, Wallingford, Conn.

[21] Appl. No.: 921,292

[22] Filed: Oct. 20, 1986

[51] Int. Cl.⁴ ............................................. G02B 6/36
[52] U.S. Cl. ........................... 350/96.20; 350/96.21; 350/96.22
[58] Field of Search ................ 350/96.2, 96.21, 96.22, 350/96.23

[56] References Cited

U.S. PATENT DOCUMENTS

| | | | |
|---|---|---|---|
| 4,279,466 | 7/1981 | Makuch et al. | 350/96.21 |
| 4,319,951 | 3/1982 | Korbelak et al. | 350/96.21 X |
| 4,359,262 | 11/1982 | Dolan | 350/96.22 X |
| 4,614,401 | 9/1986 | Strait, Jr. | 350/96.2 X |
| 4,623,156 | 11/1986 | Moisson et al. | 350/96.2 X |
| 4,629,284 | 12/1986 | Malavieille | 350/96.21 |
| 4,648,168 | 3/1987 | Nolf et al. | 350/96.2 X |
| 4,666,240 | 5/1987 | Caron et al. | 350/96.23 X |
| 4,685,764 | 8/1987 | Hoffer et al. | 350/96.23 X |
| 4,687,289 | 8/1987 | DeSanti | 350/96.2 |

Primary Examiner—Stanley D. Miller
Assistant Examiner—David R. Bertelson
Attorney, Agent, or Firm—Bacon & Thomas

[57] ABSTRACT

The invention relates to a system for field restoration of severed fiber optic cables containing multiple optical fiber conductors therein. The system includes two hermetically sealable restoration connector containers having lids to permit access to the interior thereof. The containers are interconnected by at least one fiber optic cable containing multiple optical fibers extending therein with each fiber of the cable terminated by respective fiber optic connectors which are mounted on adapters in a panel in the respective containers for interconnection to temporary connectors used in field restoration. A plurality of temporary connectors are arranged within the respective containers and each container includes a hermetically sealable opening for passing a severed cable with the fiber ends extending therefrom into the container or by the individual fibers can be rapidly terminated by the temporary connectors and the ends projecting from the temporary connectors flush cleave with the end face thereof. The temporary connectors can then be interconnected to the adapters on the panel to is corresponding permanent connector and fiber connecting to the other restoration container.

8 Claims, 7 Drawing Figures

SYSTEM FOR USE IN TEMPORARY REPAIR OF MULTIPLE FIBER CABLE

CROSS REFERENCE TO RELATED APPLICATIONS

This application is related to copending application Ser. No. 06/921,933 filed 10/20/86 filed Oct. 17, 1986, application Ser. No. 892,976 filed Aug. 4, 1986 and application Ser. No. 474,099 filed Mar. 10, 1983. The disclosures of the referenced related applications are specifically incorporated by reference herein.

BACKGROUND OF THE INVENTION

This invention relates to an improved system for use in the rapid temporary repair of severed or cut cables having optical fibers therein.

In present day fiber optic long line telephone communications, fiber optic cables containing anywhere between 12 to 72 fibers are employed which permit a high volume of telephone communications to be conducted. However, due to the nature of the material of the cable, i.e, the fibers which are extremely fragile, these cables are often subject to damage from a variety of different sources, for example, construction digging and/or accidents wherein a vehicle impacts against the cable thus severing the cable and fibers therein. These disruptions are often expensive costing the various telecommunication companies involved up to $200,000 per minute for the time that the cable is inoperative. It thus becomes necessary to quickly and accurately reconnect the various fibers to each other.

As noted in copending application Ser. No. 06/921,933 filed 10/20/86, various techniques for repairing or joining cables which have been severed are known in the prior art. One prior art technique for joining cables provides that the ends of the cables to be joined together are first reduced in diameter by using a swagging technique. A portion of each end is then removed to reveal the conductors to be joined together. After the conductors have been joined together, a longitudinally slotted length of tubing is placed around the exposed joined conductors. The tubing is then filled with a suitable insulation material such as powdered mineral insulation by inserting the insulation material into the tubing through the slot. The length of the tubing is then closed by welding and connected to the cable ends by welding or brazing. The entire joint is then drawn about the conductor joint to provide the joined cables with a substantially uniform outside diameter. This technique is illustrated in U.S. Pat. No. 4,375,720 to Bourget.

A second prior art technique is disclosed in U.S. Pat. No. 4,580,874 to Winter et al. which provides a method for repairing or joining together optical fiber cables by using a ferrule to connect two optical fiber lengths. Each cable length comprises a metal tube containing one or more optical fibers and a filler material. The ferrule is placed in overlapping relationship with each tube and a lap joint is effected between the ferrule and each tube. An outer sleeve having a length substantially equal to a gap between the tubes is formed about the ferrule and is bonded to each tube. The outer sleeve preferably has an outer periphery substantially corresponding to the outer periphery of the tube so that the joined cable has a substantially continuous surface.

Other examples of prior art fiber repair kits are disclosed in U.S. Pat. Nos. 4,367,019 to Gray and 4,379,614 to Liertz.

Although providing effective means of joining fibers together of severed cables, in practice all of these prior art teachings are time consuming and do not solve the problem of the extensive cost involved overtime when such a cable is severed. Accordingly, it becomes apparent that what is needed is a quick temporary reconnection system which will repair and maintain the fibers intact until such time as an adequate substituted fiber optic cable can be placed in service in place of the temporarily repaired cable. Moreover, since the fibers have been exposed to the elements, it also becomes necessary that whatever temporary repair is effected, is done in a manner such that the fibers are containerized and hermetically sealed with respect to the environment so as to be maintained clean so that excessive losses in transmission do not result as a consequence of exposure to the elements.

Such a system is provided in accordance with this invention.

SUMMARY OF THE INVENTION

In accordance with the invention there is provided a fiber optic cable restoration system which enables quick and effective repair of severed fiber optic cables having multiple optical fibers therein. More particularly, the system comprises at least two hermetically sealable restoration connector containers having lids to permit access to the interiors thereof. The containers are interconnected by at least one fiber optic cable containing multiple optical fibers in sheathed conditions extending therein. Each sheathed fiber of the cable is terminated by a respective fiber optic connector, typically a standard SMA type connector, with each of the connectors mounted connected to adapters mounted on a panel in each of the respective containers for connection to compatible respective temporary connectors through the adapters. Cable attachments means is arranged on each container for passing the ends of a severed fiber optic cable into the respective container and attaching the fiber of the severed cable in a hermetically sealed manner to respective temporary connectors with the fibers of the severed cable extending into the container. A plurality of temporary fiber terminating connectors are provided, corresponding to the number of fibers in the respective severed cable to be terminated for terminating the respective fibers and connecting the fibers to the connectors and fibers mounted on the panel. Accordingly, a quick and easy restoration can be provided by this system.

In a further aspect, the system comprises cleaning means for ensuring that the fiber terminated by the temporary connectors are clean at the ends thereof. More preferably, the cleaning means comprise a container of cleaning solution, preferably methanol, a container of compressed air and santized wipes such as those commercially available under the name Keri-Wipes.

In a still further aspect, the system comprises cleave tool means for cleaving the ends of fibers terminated by the temporary connectors, which fibers upon initial termination by the temporary connectors extend from the front end face of a ferrule thereof. The cleave tool means is adapted for terminating the fibers flush with the end faces of the ferrules.

In a still further more specific aspect, the cleave tool means comprises means for receiving the temporary fiber optic connector with a fiber mounted therein extending from the front thereof, as well as means for scoring the fiber at a point flush with the front end of the temporary connector. Means serves for applying a separation force to the fiber along the axis thereof to cause a separation of the fiber at the scored portion. This cleave tool and method of cleaving corresponds to that disclosed in Application Ser. No. 474,099 referred to above.

In a still further aspect, the preferred temporary connector is that disclosed in copending application Ser. No. 06/921,933 filed 10/20/86. The structure of this connector will be described in greater detail hereinafter.

BRIEF DESCRIPTON OF THE DRAWINGS

Having thus briefly described the invention, the same will become better understood from the following detailed discussion made with reference to the attached drawings wherein.

DETAILED DISCUSSION OF THE INVENTION

Figure 1:
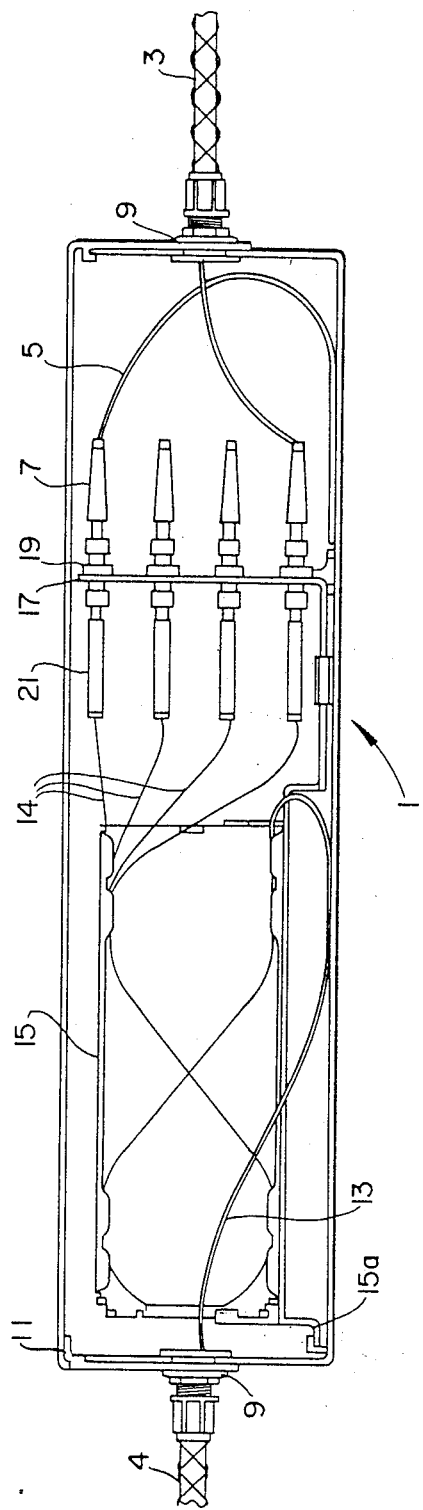
FIG. 1 is a side cross-sectional view of the container in accordance with the invention shown with temporary connectors and permanent connectors assembled therein after having effected a field restoration and showing the two fiber optic cables, i.e., the severed as well as the other cable which connects the one container to the other container extending therefrom.
Figure 2:
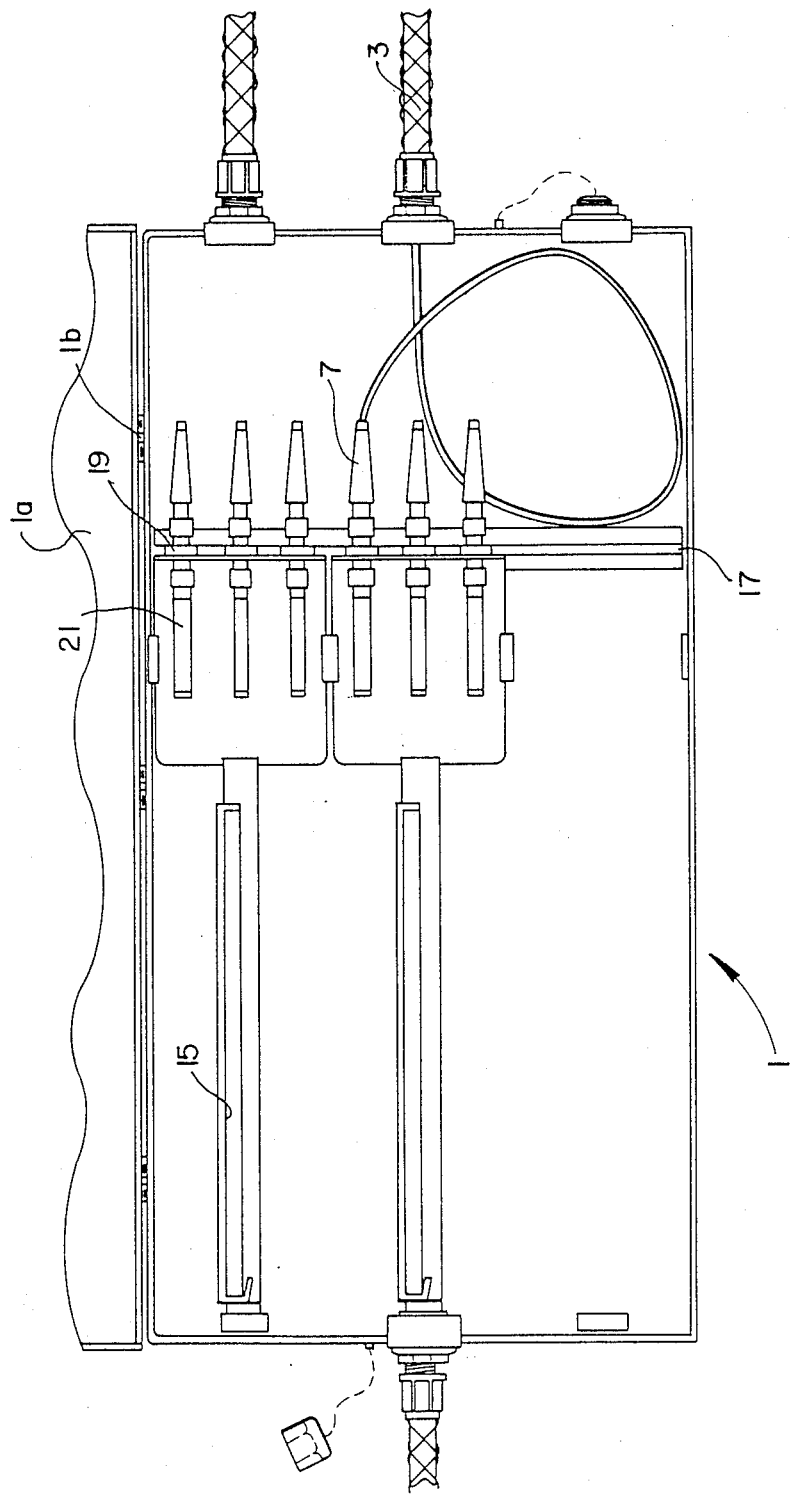
FIG. 2 is a top plan view of the container of FIG. 1 shown with the permanent connectors mounted on the panel as well as the temporary connectors, and with only one fiber connected to one of the permanent connectors and no fibers connected to the temporary connectors for ease of understanding, and with the lid of the container, in partial view, shown open.

A container 1 in accordance with the invention is shown in FIGS. 1 and 2 shown with a cable 3 which connects to another container 1 attached thereto and with a severed cable restored 4. The container 1 includes therein an adapter panel 17 having adapters 19 arranged in a matrix thereon which adapters serve to interconnect permanent type connectors 7 to temporary connectors 21. A fiber optic cable 3 containing multiple sheathed optical fiber conductors 5 is attached to the container 1 and extends thereinto at hermetic seal 9, and with a like hermetic seal 9 provided on the opposite end of the container for a severed fiber optic cable 4. As shown therein, the container 1 also includes a number of vertical dividers 15 which serve the purpose, when removed by disattachment from latch 15a, of serving as a splice tray effectively permitting accurate sorting and arrangement of individual fibers 14 which come from a bundled arrangement of fibers 13 extending from the severed cable 4. This will facilitate the attachment to the temporary connectors 21 as well as maintain some semblance of order when the restoration system is employed. As shown in FIG. 2, the container includes a lid 1a which when closed is hermetically sealed by hermetic seals 11 (shown in FIG. 1). It is noted that the hermetic seal arrangement can take various forms as will be readily apparent to those of ordinary skill in the art.

Figure 4:
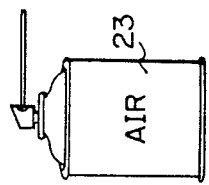
FIGS. 4 and 5 illustrate typical cleaning means employed in accordance with the invention.
Figure 5:
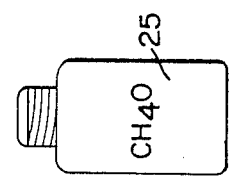
Figure 3:
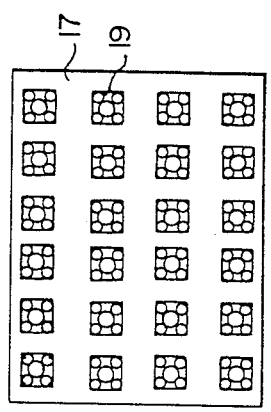
FIG. 3 is a front view of the mounting panel employed in the container according to the invention shown with the adapters mounted thereon.

As also further shown in FIG. 1, when employed to effect field restoration, the temporary connectors 21 will esch terminate an individual fiber 14 and connect it to its corresponding connector 7 and fiber on the other side of the panel 17. In a still further aspect, the kit or system further comprises, as shown in FIGS. 4 and 5, a container of compressed air, a container of methanol, as well as sanitized wipes (not shown). The container of air 23 serves to blow away dust from the ends of the fibers and the methanol container 25 serves as liquid supply to cleanse away any dirt adhering to the ends of the connectors, i.e., temporary connectors 21 when a fiber is terminated thereby.

Figure 6:
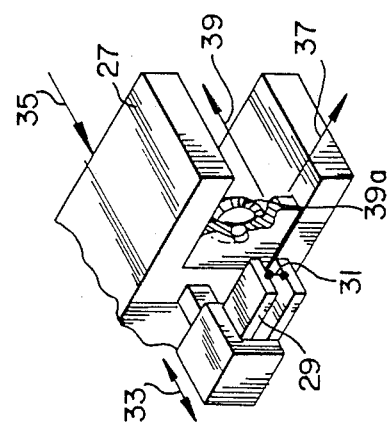
FIG. 6 illustrates schematically a typical cleaving tool which can be employed in accordance with the system of the invention.

In a still more specific aspect, the system also includes a flush cleaving tool such as for example, that shown in FIG. 6. The flush cleaving tool shown in FIG. 6 is illustrated schematically and is not intended to be limiting as to the specific structure configuration employed. As shown therein a temporary connector 21 having a fiber terminated thereby and with the fiber extending out the front end of the connector is inserted in the direction of arrow 35 between clamp surfaces 27. Spring biasing means urges scoring disc 39a in the direction of arrow 39 to be in contact flush with the end of a ferrule of a temporary connector for scoring a fiber extending therefrom. The fiber extending from the end of the temporary connector is also seized by clamp surfaces 29 which move in the direction of vertical arrow 31 and in operation, when it is desired to flush cleave the fiber with the end of the ferrule of the connector, the scoring wheel 39a is moved in the direction of arrow 37 and thereafter the fiber is tensioned, alternatively, also simultaneously, in the direction of arrows 33 to cause flush cleaving as a result of the separation force exerted upon the scored fiber. Thus, a cutting of the fiber is not necessary and a flush cleave with a smooth flat surface is achieved.

Figure 7:
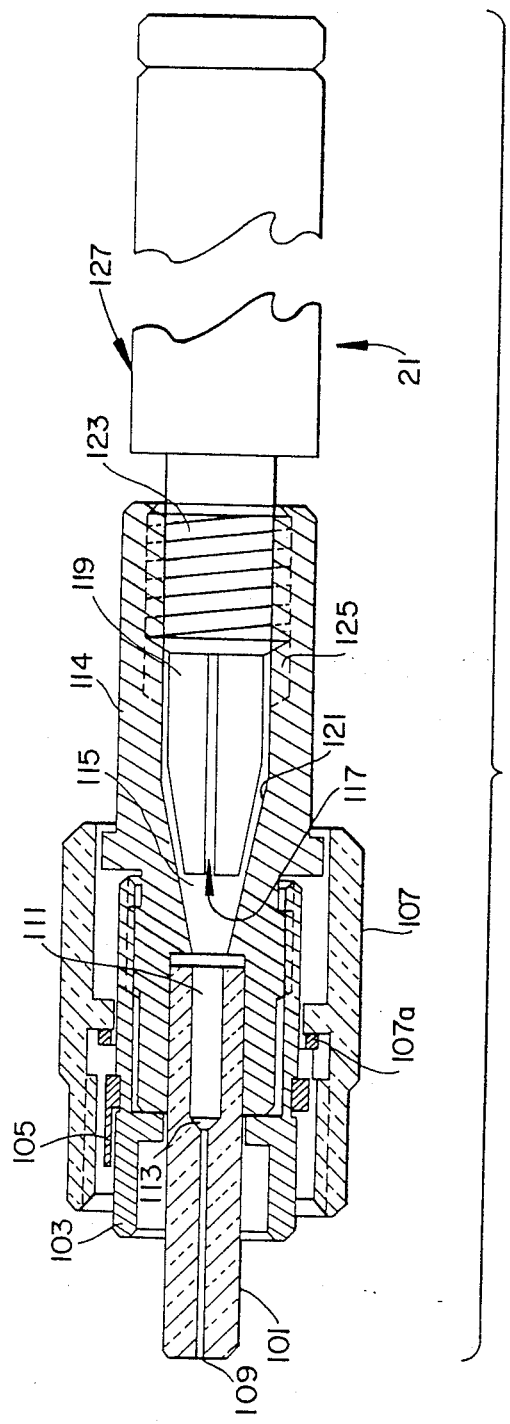
FIG. 7 illustrates a side cross-sectional view of the preferred embodiment of the temporary connector in accordance with the invention.

With respect to the specific structure of the preferred embodiment of the temporary connector employed in accordance with the invention, it is noted that the connector 21 is shown in FIG. 7 and it comprises a ceramic ferrule 101 having a passageway 109, 111 extending therethrough with a narrower portion 109 sized to snugly receive a buffer stripped fiber therein and a wider portion 111 which serves as a guide channel through ramp surfaces 113 to guide the fiber through and into the passage 109 to extend out the front end thereof. As shown therein, the passageway 109 is sized to receive a buffer stripped fiber such that a predetermined amount of buffer material can be stripped from a fiber when inserted in the connector. Accordingly, the ramp surface 113 serves as a stop to the buffer covered portion and as a guide for precise positioning of the fiber. The ceramic ferrule 101 is supported in a press-fit engagement within a front body 114. Front body 114 includes a passageway 115 extending therethrough which is coextensive with passageway 109, 111 in the ceramic ferrule 101. Supported on the front body 114 is a key member 103 which includes a key mechanism 105 for the purpose of ensuring the same relative rotational position of the connector member when connected to an adapter in the event that a connection and reconnection needs to be effected thus, preventing scarring of the face of the fiber extending flush at the front end of the ferrule 101. A coupling nut 107 of conventional construction is mounted on the front body 14 as shown therein. This coupling nut 107 combines with a conventional washer 107a to provide the means for attaching the connector to an adapter, i.e., adapters 19, for connection to a compatible connector, i.e. connectors 7.

As already discussed, the front body 114 includes the passageway 115 which is coextensive will passageway 109, 111, and which includes a sloped ramp surface 121 which serves as a biasing means as will be explained hereinafter. Furthermore, a threaded inner wall portion 125 serves to engage the fiber chuck 127 which will be discussed also hereinafter.

Fiber chuck 127 includes a passageway 117 extending therethrough which opens at the front and rear ends of the chuck 127. At the front end it includes clamp fingers 119 which serve to seize a fiber when the chuck member 127 is threaded at threads 123 fully into the front body 114.

To facilitate insertion of a fiber and clamping within the connector, the walls of passageway 117 which extends through the rear body portion and out the rear end of the chuck member 127 are preferably coated with a lubricating material, more preferably a PTFE polymer such as is conventionally available under the trade name Teflon TM.

In use in temporarily repairing fiber optic cables, the chuck 127 is partially threaded at threads 23 to the front body 114, and a fiber having a predetermined length of buffer material stripped therefrom is inserted from the rear of the chuck member 127 through the chuck member passageway 117 into passageway 111 and through passageway 109 so that the fiber stripped of buffer material extends out the front of the ferrule 101. The portion of the fiber not stripped of buffer abuts at sloped wall portion 113 which serves as a stop. Thereafter, threading of the chuck member 127 is continued until walls 121 engage the spring fingers 119 at the front end thereof and are thereby forced to close onto the buffer covered fiber to securely hold the fiber at that point. Tightening is conducted to a finger pressure level. Thereafter, with the fiber extending out the front face of the ferrule 101, the fiber is cleaved flush with the end of the ferrule by the tool illustrated in FIG. 6, and the assembly is ready for connection to the matable connector 7 mounted on panel 17 through adapters 19.

As noted previously, the flush cleaving method can be conducted, for example as in the method disclosed in U.S. Application Ser. No. 474,099 which was filed Mar. 10, 1983 and which is now allowed. The matable connectors 7 can be of conventional construction or alternatively can be of the improved construction illustrated in copending U.S. Application Ser. No. 892,976 which was filed Aug. 4, 1986.

With respect to the materials employed in the invention, the selection thereof will be readily apparent to those of ordinary skill in the art and can include such materials as conventional metal, for example, stainless steel as well as ceramic plugs for the ferrules of the connectors.

Having about indicated a preferred embodiment of the present invention, it will be readily apparent to those of ordinary skill in the art that modifications and alternatives can be practiced within the spirit of the invention. It is accordingly, intended to define the scope of the invention only as indicated in the following claims.

What is claimed is:

1. A fiber optic cable restoration system for restoring severed fiber optic cables, comprising: at least two hermetically sealable restoration connector containers having lids to permit access to the interiors thereof; said containers interconnected by at least one fiber optic cable containing multiple optical fibers extending therein; each fiber of said cable terminated by a respective fiber optic connector, with each of said connectors mounted connected to adapters mounted on a panel in said respective containers for connection to compatible respective connectors through the adapters; cable attachment means arranged on each container for passing the end of a severed fiber optic cable into each one of said containers and attaching the severed cable in a hermetically sealed manner to the respective connector; and a plurality of temporary fiber terminating connectors, corresponding to the number of fibers in the respective severed cable for terminating the respective severed fibers and for connecting the thus terminated fibers to the connectors and fibers mounted on said panel.

2. A system as in claim 1 further comprising cleaning means for ensuring that fibers terminated by said temporary connectors are clean at the ends thereof.

3. A system as in claim 1 further comprising cleave tool means for cleaving the ends of fibers terminated by said temporary connectors in a manner flush with the end faces thereof.

4. A system as in claim 2 wherein said cleaning means comprises a container of cleaning liquid, a container of compressed air and sanitized wipes.

5. A system as in claim 4 wherein said cleaning liquid is methanol.

6. A system as in claim 1 wherein said temporary connectors comprise respectively:
   a ceramic plug having a front end and a rear end, a passageway extending through said plug with said passageway sized to snugly receive a buffer stripped optical fiber therethrough in a manner extending out the front end, and said passageway having a size proximate the rear end such as to permit a portion of buffer covered optical fiber to be received therein;
   a plug support supporting the rear end of the ceramic plug, and said plug support having a passageway coextensive with said plug passageway, and having biasing wall surfaces in said support passageway at a location proximate to the rear end of said ceramic plug; and
   chuck means having clamping means for holding a fiber, said chuck means having a passageway extending therethrough coextensively with the plug support passageway whereby an optical fiber can be passed from the rear thereof therethrough into said ceramic plug to extend from the front end of said ceramic plug, said chuck means engageable to said plug support in a manner such that said biasing wall surfaces engage said clamping means to cause said clamping means to securely seize a buffer covered fiber received therein.

7. A system as in claim 6 further comprising cleave tool means for cleaving the ends of fibers terminated by said temporary connector flush with the front end of said plug.

8. A system as in claim 7 wherein said tool means comprises means for receiving the temporary fiber optic connector with the front end of a fiber mounted therein extending from the front thereof; means for scoring the fiber at a point flush with the end of the plug; and means for applying a separation force to said fiber along the axis thereof to cause a separation of the fiber at the scored portion.

* * * * *